United States Patent [19]
Iwatani et al.

[11] Patent Number: 5,925,939
[45] Date of Patent: Jul. 20, 1999

[54] CONTROLLER FOR CAR GENERATOR

[75] Inventors: Shiro Iwatani; Tsunezi Gouda, both of Tokyo-to, Japan

[73] Assignee: Mitsubishi Denki Kabushiki Kaisha, Tokyo, Japan

[21] Appl. No.: 08/932,236

[22] Filed: Sep. 17, 1997

[30] Foreign Application Priority Data

Feb. 17, 1997 [JP] Japan .................................. 9-032327

[51] Int. Cl.⁶ .................................................. H02P 3/00
[52] U.S. Cl. ............................. 307/10.1; 322/10; 322/34
[58] Field of Search .................................. 307/9.1, 10.1, 307/10.7; 320/124, 137, 150, 160; 322/10, 11, 28, 29, 32, 99, 33, 34; 361/106

[56] References Cited

U.S. PATENT DOCUMENTS

| | | | |
|---|---|---|---|
| 4,398,140 | 8/1983 | Morishita | 320/34 |
| 4,594,631 | 6/1986 | Iwaki | 322/33 |
| 4,739,243 | 4/1988 | Iwatani et al. | 322/10 |

FOREIGN PATENT DOCUMENTS 62-104500   5/1987   Japan .

*Primary Examiner*—Richard T. Elms
*Attorney, Agent, or Firm*—Sughrue, Mion, Zinn, Macpeak & Seas, PLLC

[57] ABSTRACT

The startability of an internal combustion engine at low temperatures is improved and the revolution stability of the internal combustion engine right after start-up is increased by setting the predetermined maximum value of field current to a low level at low temperatures and to a high level at high temperatures by field current limit setting means.

5 Claims, 4 Drawing Sheets

CONTROLLER FOR CAR GENERATOR

BACKGROUND OF THE INVENTION

1. Field of the Invention

This invention relates to a controller for controlling a generator mounted on a vehicle such as an automobile.

2. Description of the Prior Art

FIG. 5 is a circuit diagram of a controller for a car generator of the prior art disclosed in Laid-open Japanese Patent Application No. Sho 62-104500. In FIG. 5, reference numeral 1 denotes an AC generator having an armature coil 101 and a field coil 102. Reference numeral 2 denotes a full-wave rectifier having rectifying diodes 203 to 208 for rectifying the output of the AC generator 1, 201 a positive-side output terminal of the full-wave rectifier 2 and 202 is a negative-side output terminal of the full-wave rectifier 2. Numeral 3 designates a voltage regulator for regulating the output voltage of the AC generator 1 to a predetermined value and having a power transistor 301 for controlling a field current running through the field coil 102 of the AC generator 1 intermittently. A current detection resistor 302 is connected to the emitter of the power transistor 301 and to the ground. A field current limiter 4 is provided for limiting the maximum value of a field current running through the field coil 102 to a predetermined value. This field current limiter 4 has a comparator 403 for comparing a field current detected by the current detection resistor 302 of the voltage regulator 3 with a set value obtained by dividing a voltage from a constant voltage source A by voltage dividing resistors 401 and 402 to control the power transistor 301 of the voltage regulator 3. A storage battery 5 is charged by the rectified output of the AC generator 1.

FIG. 4 is a diagram showing the output characteristics of the controller of the prior art with respect to the temperature of the generator and the output characteristics of the controllers of Embodiments 1, 2 and 3 of the present invention to be described hereinafter with respect to the temperature of the generator. In the relationship between the temperature of the generator and the field current of FIG. 4, 54 indicates the output characteristics of the generator itself and 55 the output characteristics of the controller of the prior art. In the relationship between the temperature of the generator and the output current of the generator, 51 indicates the output characteristics of the generator itself and 52 the output characteristics of the controller of the prior art. In the case of the controller of the prior art, as shown in FIG. 4, the field current is controlled not to exceed a predetermined value at a temperature below a predetermined temperature (output characteristics 52 and 55).

In the case of the controller for a car generator of the prior art as described above, though the field current of the generator when it is cold can be limited to a level when it is hot, it is impossible to meet a demand for reducing the drive torque of the generator when it is cold. Therefore, especially at low temperatures, the drive torque load affects the internal combustion engine which is a drive source for the generator with the result that the startability and revolution stability right after start-up of the internal combustion engine deteriorate. Further, when the limitation amount at low temperatures is made large, the output of the generator at an actual temperature range is reduced.

SUMMARY OF THE INVENTION

It is therefore an object of the present invention which has been made to solve the above problem to provide a controller for a car generator which improves the starting characteristic of an internal combustion engine at low temperatures and which provides excellent revolution stability of the internal combustion engine right after start-up.

According to a first aspect of the present invention, there is provided a controller for a car generator which increases the maximum value of the field current of a generator mounted on a vehicle as the temperature of the generator rises and controls the maximum value not to exceed a predetermined value at a predetermined temperature.

According to a second aspect of the present invention, there is provided a controller for a car generator for adjusting the output of a generator mounted on a vehicle by controlling the field current of the generator, comprising:

voltage regulating means for controlling the output of the generator, field current limiting means for limiting the maximum value of the field current to a predetermined value, and field current limit setting means for controlling the maximum value of field current which is limited by the field current limiting means to increase as the temperature of the generator rises and not to exceed a predetermined value when the temperature of the generator is a predetermined temperature.

According to a third aspect of the present invention, there is provided a controller for a car generator wherein the field current limit setting means divides a predetermined voltage by connecting a first resistor and a second resistor having a positive resistance temperature coefficient larger than the resistance temperature coefficient of the first resistor in series and sets the maximum value of the field current according to this divided voltage.

The above and other objectives, features and advantages of the invention will become more apparent from the following description when taken in conjunction with the accompanying drawings.

DETAILED DESCRIPTION OF THE PREFERRED EMBODIMENTS

Embodiment 1

Figure 1:
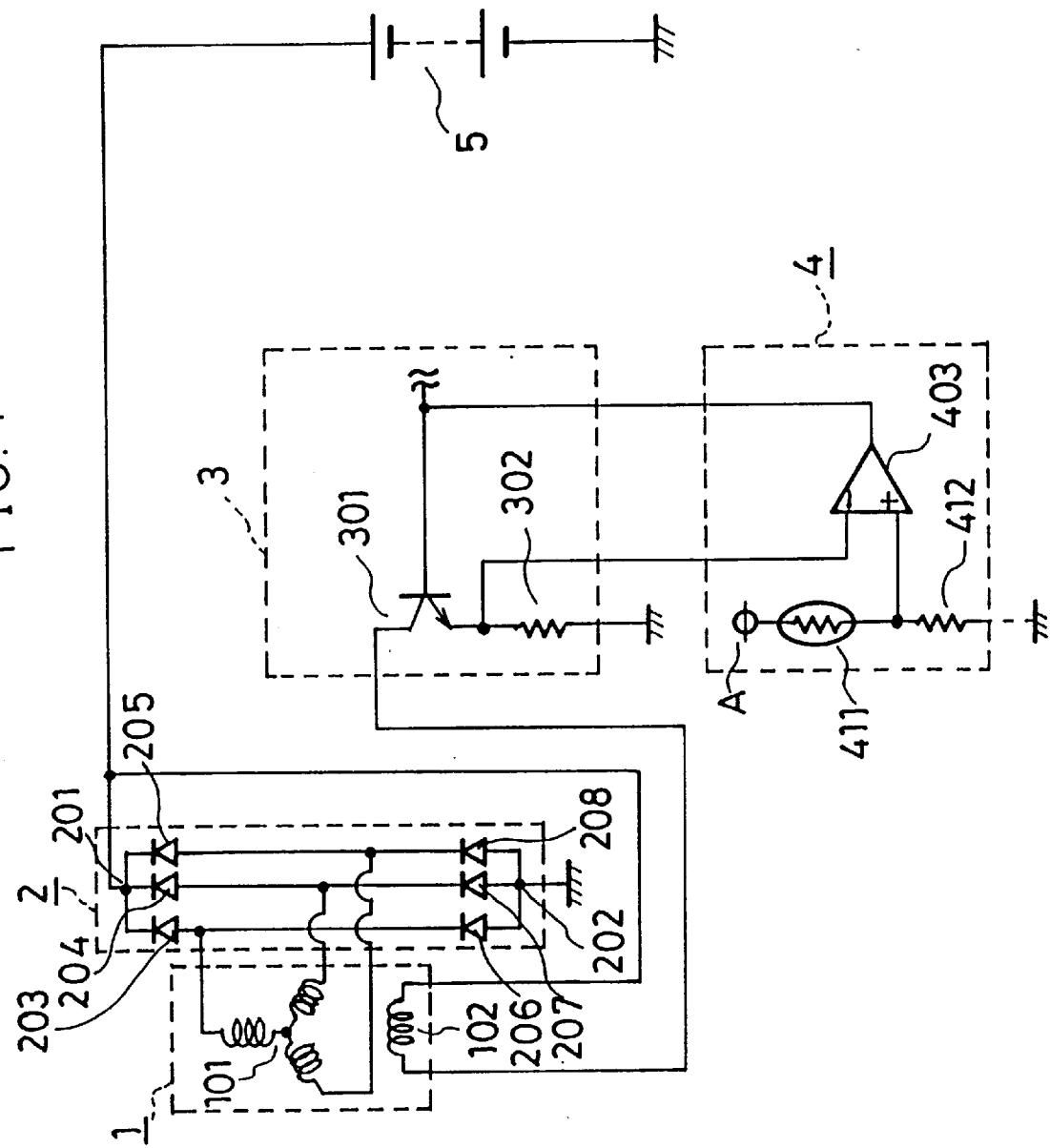
FIG. 1 is a circuit diagram of a controller for a car generator according to Embodiment 1 of the present invention.
Figure 5:
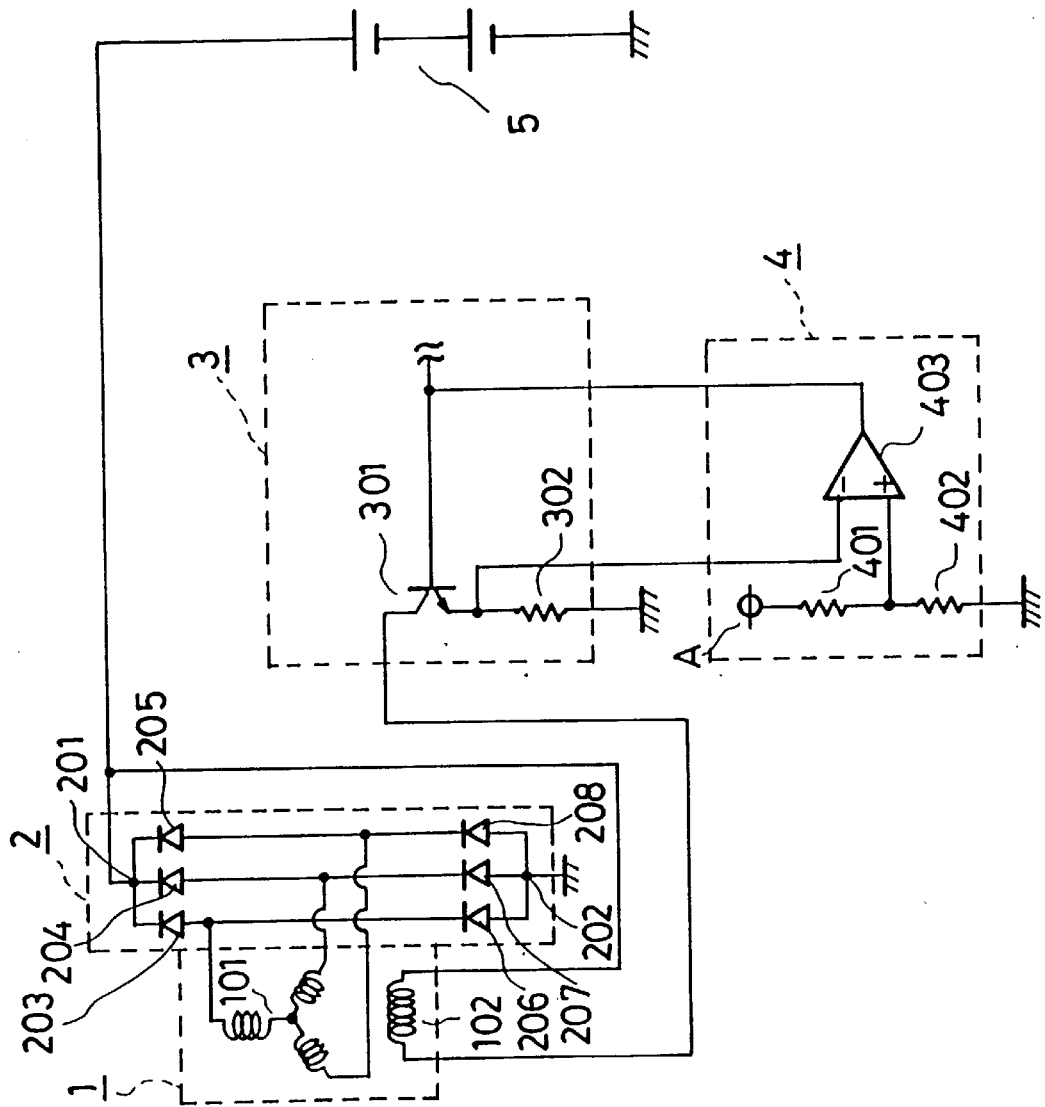
FIG. 5 is a circuit diagram of a controller for a car generator of the prior art.

FIG. 1 is a circuit diagram of a controller for a car generator according to Embodiment 1 of the present invention. In FIG. 1, the same or corresponding elements are given the same reference numerals as those of FIG. 5 and their descriptions are omitted. In the field current limiter 4 of FIG. 1, a thermistor 411 is provided as field current limit setting means for limiting the maximum value of field current running through the field coil 102 of the AC generator 1 to a low level at low temperatures and to a high level at high temperatures, which is connected to the non-reverse input terminals of the constant voltage source A and the comparator 403. A resistor 412 is connected to the non-reverse input terminal of the comparator 403 and the ground. A potential divided by the thermistor 411 and the resistor 412 is provided to the non-reverse input terminal of the comparator 403. A potential at a connection point between the resistor 302 and the emitter of the power transistor 301 is provided to the reverse input terminal of the comparator 403 and the output of the comparator 403 is provided to the base of the power transistor 301.

Figure 4:
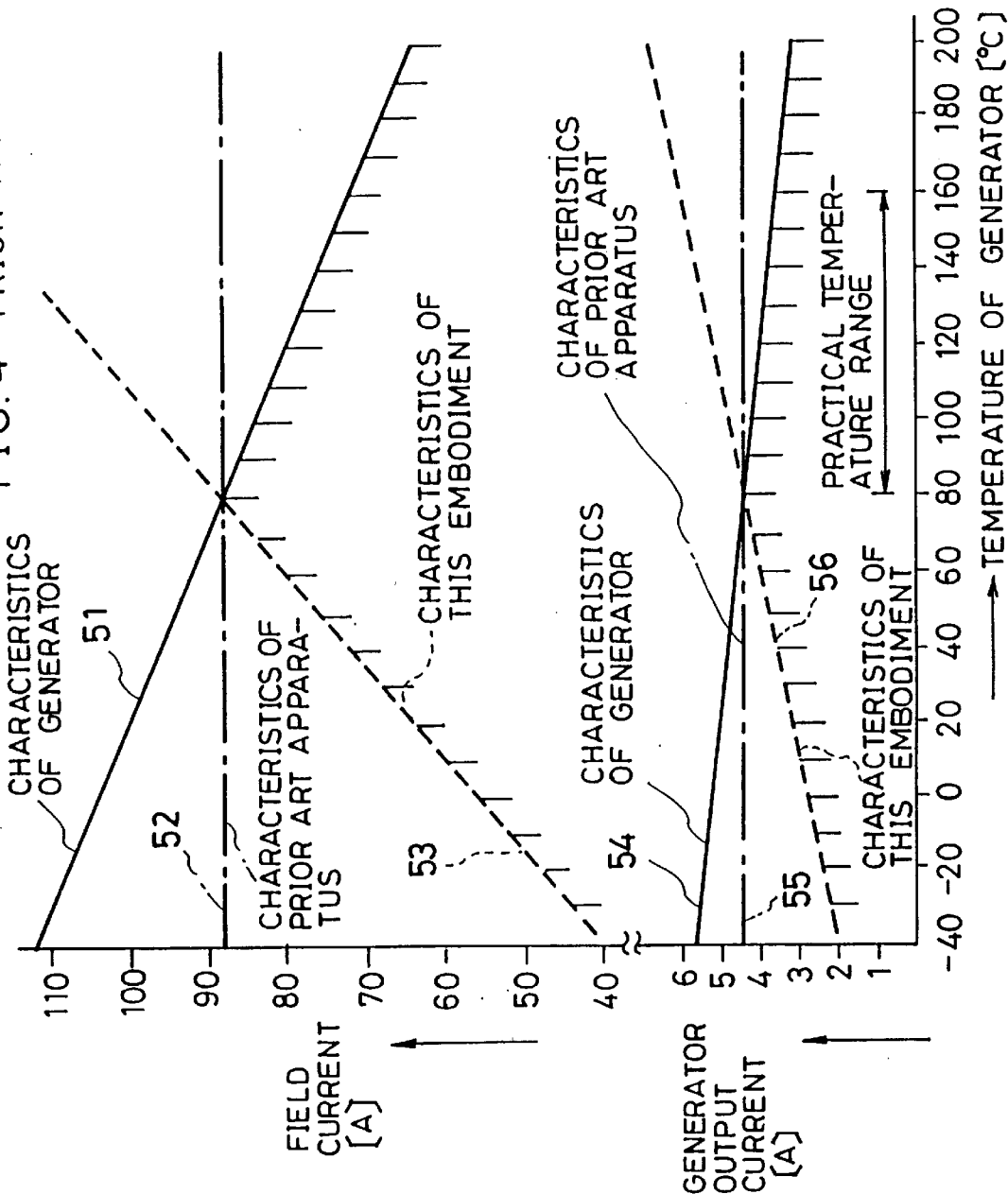
FIG. 4 is a diagram showing the output characteristics of a controller of the prior art with respect to the temperature of a generator and the output characteristics of the controllers of Embodiments 1, 2 and 3 of the present invention with respect to the temperature of the generator.

A description is subsequently given of the operation of this embodiment. When an unshown internal combustion engine is started, the AC generator 1 runs, and the AC power output of the armature coil 101 is provided to the full-wave rectifier 2, rectified and applied to the storage battery 5 as a DC current. The storage battery 5 is thereby charged. The power output of the AC generator 1 is adjusted by controlling a field current running through the field coil 102. First, when the internal combustion engine is started, the temperature thereof is low and the temperature of the AC generator 1 is also low. When the AC generator 1 runs, the temperature of the AC generator 1 itself rises along with the passage of time, coil resistance increases and the power output of the AC generator 1 exhibit the output characteristics 51 and 54 of the generator itself shown in FIG. 4. That is, as the temperature rises, the coil resistances of the armature coil 101 and the field coil 102 increase whereas the field current and the output current of the generator decrease. Then, to prevent the field current and the output current of the generator from decreasing as the temperature rises, the thermistor 411 is provided in Embodiment 1 of the present invention as field current limit setting means. Since this thermistor 411 has a negative resistance temperature coefficient, the resistance value is large at low temperatures and decreases as the temperature rises. Therefore, the potential of the non-reverse input terminal of the comparator 403 increases as the temperature rises and the output voltage of the comparator 403 increases. Thereby, the power transistor 301 serves to let pass a large amount of field current of the field coil 102 and is controlled to maintain the power output of the AC generator 1 at a constant level. In other words, as shown in FIG. 4, according to Embodiment 1 of the present invention, the characteristics of the relationship between the temperature of the generator and the field current become characteristics denoted by 56 and the characteristics of the relationship between the temperature and the output current of the generator become characteristics denoted by 53. This means that the maximum value of field current is set to a low level at low temperatures and to a high level at high temperatures. Therefore, the field current is maintained at almost a constant level due to the characteristics 54 of the generator itself and the characteristics 56 of the controller and the output current of the generator is maintained at almost a constant level due to the characteristics 51 of the generator itself and the characteristics 53 of the controller.

In this embodiment, as is evident from the temperature characteristics of FIG. 4, the controller controls such that the maximum value of field current increases from about 2A to about 9A in proportion to a rise in the temperature of the generator from −40° C. to 80° C. However, the control may not be precise proportional control.

According to Embodiment 1 described above, since the maximum value of the field current of the AC generator is set to a low level at low temperatures and to a high level at high temperatures by the thermister, the limit value of field current has positive temperature characteristics, thereby making it possible to reduce the field current at low temperatures, to lighten a drive torque load to the internal combustion engine at the time of start-up at low temperatures or at low temperatures and not to impair the power output at an actual temperature range. Thereby, the startability of the internal combustion engine at low temperatures is greatly improved and the revolution stability of the internal combustion engine right after start-up is increased.

Embodiment 2

Figure 2:
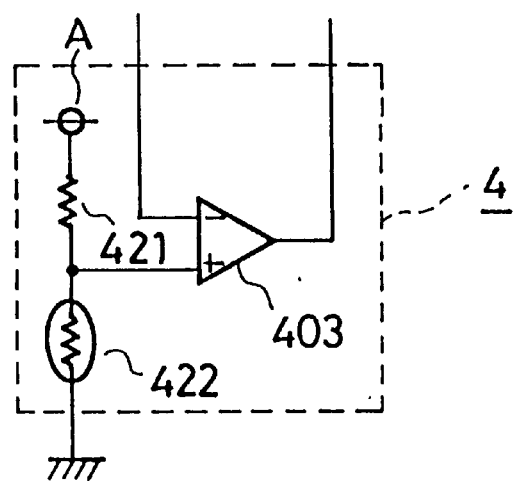
FIG. 2 is a circuit diagram of a field current limiter of a controller for a car generator according to Embodiment 2 of the present invention.

FIG. 2 is a circuit diagram of a field current limiter in a controller for a car generator according to Embodiment 2 of the present invention. The entire configuration of the controller of Embodiment 2 is shown in FIG. 1 and is the same as that of FIG. 2 except that the field current limiter 4 of FIG. 1 is replaced by the field current limiter 4 of FIG. 2. In the field current limiter 4 of FIG. 2, A posistor 422 is provided (device whose resistance increases as the temperature rises) as field current limit setting means for setting the predetermined maximum value of field current running through the field coil 102 of the AC generator 1 (see FIG. 1) to a low level at low temperatures and to a high level at high temperatures. One end of this posistor 422 is connected to the constant voltage source A through a resistor 421 and the other end is grounded. The connection point between the posistor 422 and the resistor 421 is connected to the non-reverse input terminal of the comparator 403.

A description is subsequently given of the operation of this Embodiment. Since the overall operation has been described with reference to FIG. 1, a characteristic operation is described hereinunder. To prevent a field current and the output current of the generator from decreasing as the temperature rises, the posister 422 is provided in Embodiment 2 as field current limit setting means. Since this posistor 422 has a positive resistance temperature coefficient, its resistance value is small at low temperatures and increases as the temperature rises. Therefore, the potential of the non-reverse input terminal of the comparator 403 increases as the temperature rises and the output potential of the comparator 403 also increases. Thereby, the power transistor 301 (see FIG. 1) serves to let pass a large amount of the field current of the field coil 102 and is controlled to maintain the power output of the AC generator 1 at a constant level. In other words, as shown in FIG. 4, in Embodiment 2 of the present invention, the characteristics of the relationship between the temperature of the generator and the field current become characteristics denoted by 56 and the characteristics of the relationship between the temperature of the generator and the output current of the generator become characteristics denoted by 53. This means that the predetermined maximum value of field current is set to a low level at low temperatures and to a high level at high temperatures. Therefore, the field current is maintained at almost a constant level due to the characteristics 54 of the generator itself and the characteristics 56 of the controller and the output current of the generator is maintained at almost a constant level due to the characteristics 51 of the generator itself and the characteristics 53 of the controller.

According to Embodiment 2 described above, since the maximum value of the field current of the AC generator is set to a low level at low temperatures and to a high level at high temperatures by the posistor, the limit value of field current has positive temperature characteristics, thereby making it possible to reduce the field current at low temperatures, reduce a drive torque load to the internal combustion engine at the time of start-up at low temperatures or at low temperatures and not to impair the power output at an actual temperature range. Thereby, the startability of the internal combustion engine at low temperatures is greatly improved and the revolution stability of the internal combustion engine right after start-up is increased.

Embodiment 3

Figure 3:
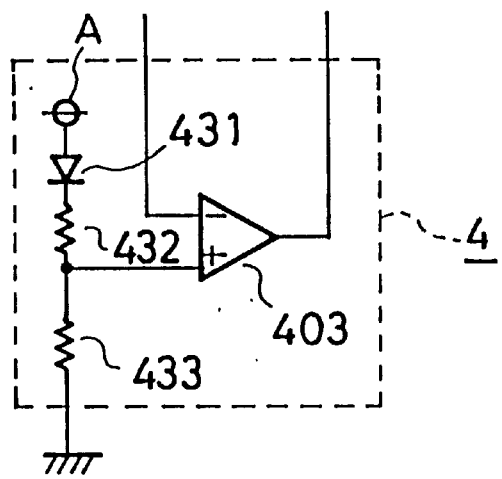
FIG. 3 is a circuit diagram of a field current limiter of a controller for a car generator according to Embodiment 3 of the present invention.

FIG. 3 is a circuit diagram of a field current limiter in a controller for a car generator according to Embodiment 3 of the present invention. The entire configuration of the controller of Embodiment 3 is shown in FIG. 1 and is the same as that of FIG. 1 except that the field current limiter 4 of FIG. 1 is replaced by the field current limiter 4 of FIG. 3. In the field current limiter 4 of FIG. 3, a diode 431 is provided as field current limit setting means for setting the predetermined maximum value of field current running through the field coil 102 of the AC generator 1 (see FIG. 1) to a low level at low temperatures and to a high level at high temperatures. The anode of this diode 431 is connected to the constant voltage source A and the cathode thereof is grounded through resistors 432 and 433. The connection point between the resistors 432 and 433 is connected to the non-reverse input terminal of the comparator 403.

A description is subsequently given of the operation of this Embodiment. Since the overall operation has been described with reference to FIG. 1, a characteristic operation is described hereinunder. To prevent a field current and the output current of the generator from decreasing as the temperature rises, the diode 431 is provided in Embodiment 3 as field current limit setting means. Since this diode 431 has positive characteristics with respect to temperature, its forward resistance is large at low temperatures and decreases as the temperature rises. Therefore, the potential of the non-reverse input terminal of the comparator 403 increases as the temperature rises and the output potential of the comparator 403 also increases. Thereby, the power transistor 301 (see FIG. 1) serves to let pass a large amount of the field current of the field coil 102 and is controlled to maintain the power output of the AC generator 1 at a constant level. In other words, as shown in FIG. 4, in Embodiment 3 of the present invention, the characteristics of the relationship between the temperature of the generator and the field current become characteristics denoted by 56 and the characteristics of the relationship between the temperature of the generator and the output current of the generator become characteristics denoted by 53. This means that the predetermined maximum value of field current is set to a low level at low temperatures and to a high level at high temperatures. Therefore, the field current is maintained at almost a constant level due to the characteristics 54 of the generator itself and the characteristics 56 of the controller and the output current of the generator is maintained at almost a constant level due to the characteristics 51 of the generator itself and the characteristics 53 of the controller.

According to Embodiment 3 described above, since the maximum value of the field current of the AC generator is set to a low level at low temperatures and to a high level at high temperatures by the diode, the limit value of field current has positive temperature characteristics, thereby making it possible to reduce the field current at low temperatures, reduce a drive torque load to the internal combustion engine at the time of start-up at low temperatures or at low temperatures and not to impair the power output at an actual temperature range. Thereby, the startability of the internal combustion engine at low temperatures is greatly improved and the revolution stability of the internal combustion engine right after start-up is increased.

According to the first aspect of the present invention, since the maximum value of the field current of the generator mounted on a vehicle is controlled to increase as the temperature of the generator rises and not to exceed a predetermined value when the temperature of the generator is a predetermined temperature, the limit value of field current has positive temperature characteristics, thereby making it possible to reduce the field current at low temperatures, reduce a drive torque load to the internal combustion engine at the time of start-up at low temperatures or at low temperatures and not to impair the power output at an actual temperature range. Thereby, the startability of the internal combustion engine at low temperatures is greatly improved and the revolution stability of the internal combustion engine right after start-up is increased.

According to the second aspect of the present invention, since the controller comprises voltage regulating means for controlling the output of the generator by controlling the field current, field current limiting means for limiting the maximum value of field current to a predetermined value, and field current limit setting means for controlling the maximum value of field current limited by the field current limiting means to increase as the temperature of the generator rises and not to exceed a predetermined value when the temperature of the generator is a predetermined temperature. Therefore, the revolution stability of the internal combustion engine right after start-up can also be improved.

According to the third aspect of the present invention, since the field current limit setting means divides a predetermined voltage by connecting a first resistor and a second resistor having a positive resistance temperature coefficient larger than the resistance temperature coefficient of the first resistor in series and setting the maximum value of field current according to this divided voltage, the revolution stability of the internal combustion engine right after start-up can also be improved with a relatively simple circuit configuration.

What is claimed is:

1. A method for controlling a generator mounted on a vehicle comprising controlling a maximum value of a field current of the generator so that the maximum value of the field current increases as an operating temperature of the generator rises and does not exceed a predetermined value when the operating temperature of the generator is a predetermined temperature.

2. A controller for a car generator for adjusting the output of a generator mounted on a vehicle by controlling a field current of the generator, comprising:

a voltage regulator for controlling the output voltage of the generator by controlling the field current; and a field current limiting circuit for limiting a maximum value of the field current to a predetermined value, said field current limiting circuit comprising a field current limit setting means for controlling the maximum value of the field current so that the maximum value of the field current increases as an operating temperature of the generator increases and does not exceed a predetermined value when the operating temperature of the generator is a predetermined temperature.

3. The controller for a car generator according to claim 2, wherein the field current limit setting circuit comprises:

a resistor connected to a ground potential; and a thermistor having a negative resistance temperature coefficient, wherein said thermistor is connected to said resistor and a voltage source supplying a predetermined voltage to form a voltage divider for dividing the predetermined voltage to generate a divided voltage which determines the maximum value of the field current set by the field current limit setting means.

4. The controller for a car generator according to claim 2, wherein the field current limit setting means comprises:
- a resistor connected a voltage source supplying a predetermined voltage; and
- a posistor having a positive resistance temperature coefficient, wherein said posistor is connected to said resistor and a ground potential to form a voltage divider for dividing the predetermined voltage to generate a divided voltage which determines the maximum value of the field current set by the field current limit setting means.

5. The controller for a car generator according to claim 2, wherein the field current limit setting means comprises:
- a first resistor connected a ground potential;
- a second resistor connected to said first resistor;
- a diode connected between said second resistor and a voltage source supplying a predetermined voltage, wherein said first resistor and said second resistor form a voltage divider for dividing the predetermined voltage to generate a divided voltage which determines the maximum value of the field current set by the field current limit setting means.

* * * * *